A. F. HOLMBERG.
INSTRUMENT BOARD FOR AUTOMOBILES.
APPLICATION FILED APR. 29, 1915.
1,211,707.
Patented Jan. 9, 1917.
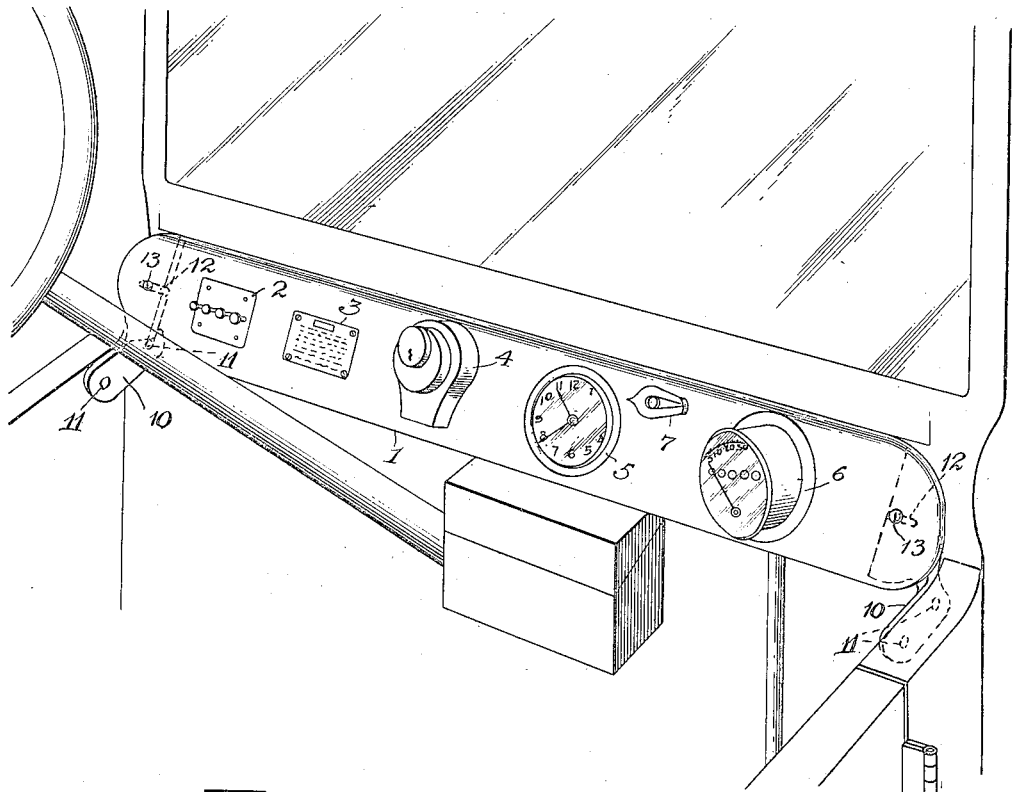
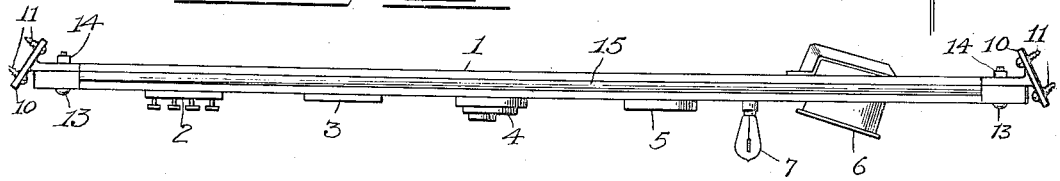
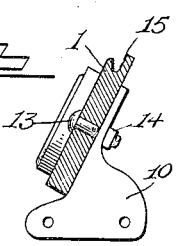 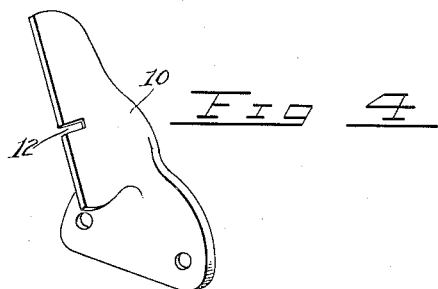
WITNESSES:
Alan Franklin
P. S. Tidwell
INVENTOR
Axel F. Holmberg
BY John F. Mills
ATTORNEY

UNITED STATES PATENT OFFICE.

AXEL F. HOLMBERG, OF SAN FRANCISCO, CALIFORNIA.

INSTRUMENT-BOARD FOR AUTOMOBILES.

1,211,707.     Specification of Letters Patent.     Patented Jan. 9, 1917.

Application filed April 29, 1915. Serial No. 24,692.

*To all whom it may concern:*

Be it known that I, AXEL F. HOLMBERG, a citizen of the United States, and a resident of the city and county of San Francisco, in the State of California, have made a new and useful invention,—to wit, an Instrument-Board for Automobiles; and I hereby declare the following to be a full, clear, concise, and exact description of the same.

The invention contemplates an instrument board, upon which the automobile instruments, such as the light switch, speedometer, clock, etc., may be conveniently mounted, which board may be readily attached to the automobile in such position that the instruments may be easily read by the automobile driver, or detached for repairs.

In this specification and annexed drawing, I illustrate the invention in the form which I consider the best, but it is to be understood that I do not limit myself to such form because the said invention may be embodied in other forms, and it is also to be understood that in and by the claims following the description herein, I desire to cover the invention in whatever form it may be embodied.

Referring to the drawing, accompanying this specification, and annexed thereto, Figure 1 is a perspective view of the instrument board with the instruments thereon attached in position on an automobile. Fig. 2 is a top edge view of the instrument board and attaching brackets. Fig. 3 is a transverse sectional view through the instrument board showing one of the brackets attached thereto. Fig. 4 is a perspective view of one of the brackets supporting the instrument board.

The instrument board is particularly adapted to be attached to a Ford automobile, but I do not limit the application of the board to this particular automobile, as it may be applied to other automobiles.

The invention comprises a board 1, upon which are mounted the various instruments and devices used on an automobile, such as a light switch 2, license plate 3, auto-lock 4, clock 5, speedometer 6 and light 7. Said board is preferably placed horizontally across the automobile body, adjacent the wind shield of the automobile, where the instruments on the board may be easily read by the driver of the automobile. A bracket 10 is secured by screws 11 to the inner face of each side wall of the automobile body at a point below the wind shield upon which brackets rest the respective ends of the instrument board 1. Said brackets are inclined so that the board will lie in an inclined position substantially perpendicular to the direction of the driver's sight from his seat on the automobile. Such position of the instrument board greatly aids the driver in reading the instruments. Said brackets are provided with slots 12 through which are projected screws 13 which screws extend through the board 1 and upon which screw nuts 14 against the brackets whereby the board is clamped to the brackets. The board 1 is provided with a longitudinal groove 15 along its upper edge in which fits the lower edge of the lower member of the wind shield frame, whereby the upper edge of the board is fitted neatly against said lower wind shield frame member and is prevented from springing and warping.

The face of the instrument at the extreme right of the driver is inclined with relation to the board 1 toward the driver's seat, so that said instrument may be more easily read by the driver.

The board may be readily removed to repair the instruments by disengaging the screws 13 from the brackets 10.

The instruments may be detachably secured to the board so that they may be removed and placed on the board independently.

On a Ford automobile the instrument board will rest directly over the coil box. The inclination of the board provides sufficient clearance above the coil box for placing of the coils in the box and for removal of the coils for repairs.

I claim:

1. In combination with a vehicle, an instrument board, a pair of brackets secured to the side wall of said vehicle, each of said brackets having a base portion for attachment to the vehicle, and a board engaging portion adapted to be engaged by said instrument board, the board engaging portion being formed with an end opening slot, and a fastening member passing through the instrument board and through said slot to removably secure the instrument board to the bracket.

2. In combination with a vehicle, an instrument board, a pair of brackets secured to the side walls of the vehicle body, said brackets having base portions for attachment to the body, inclined portions adapted to be engaged by said instrument board, the inclined portions being formed with inwardly opening slots and screw bolts passing through the instrument board and through said slots to removably secure the instrument board to the brackets.

In testimony whereof, I have hereunto set my hand at the city and county of San Francisco, California, this 19th day of April 1915.

AXEL F. HOLMBERG.

In presence of—
ALAN FRANKLIN,
P. S. PIDWELL.